United States Patent Office 3,200,698
Patented Aug. 17, 1965

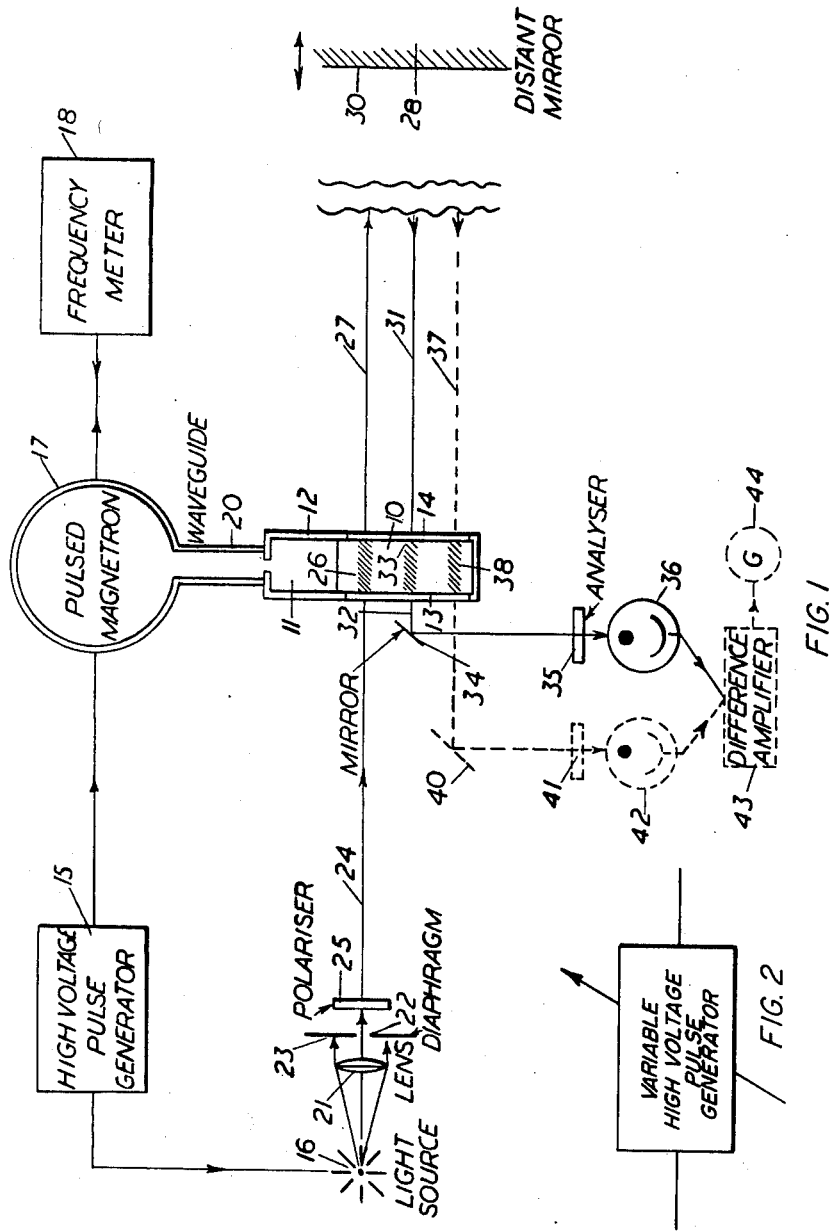

3,200,698
MEASUREMENT OF DISTANCE BY MEANS OF MODULATED POLARIZED LIGHT
Keith Davy Froome and Robert Howard Bradsell, Teddington, England, assignors to National Research Development Corporation, London, England, a British corporation
Filed Sept. 18, 1961, Ser. No. 138,839
Claims priority, application Great Britain, Sept. 22, 1960, 32,675/60
6 Claims. (Cl. 88—1)

This invention concerns an apparatus for testing whether a light reflecting means is in a desired position.

The term "light reflecting means," is used in this specification in a broad sense to include not only plane mirrors but also, for example, internally reflecting prisms and reflectors of the "cat's eye" type consisting of a plane or concave mirror at the focus of a convex lens.

According to one aspect of the present invention, there is provided a means for testing whether a light reflecting means is in a desired position comprising employing a device which produces a beam of polarised light whose polarisation is cyclically modulated, said device being disposed at a known position, directing said beam onto said light reflecting means, examining at a given point the light reflected from said light reflecting means so as to determine the extent to which the polarisation of the reflected light at said point is modulated, and deducing therefrom the distance of said device from said light reflecting means in terms of the wavelength of the cyclical modulation of the polarised light.

Preferably the reflected light is examined after it has passed through light transmitting means such that the intensity of the light transmitted thereby varies in sympathy with the said cyclical modulation.

Preferably the said distance is determined by altering the length of the light path from the said device to the said light reflecting means until the polarisation of the reflected light at said point has a predetermined (e.g. a zero) degree of modulation, and meansuring the extent to which the light path has been altered.

The length of the light path may be altered by effecting relative movement between the said device and the said light reflecting means.

Alternatively, the positions of the said device and the said light reflecting means may be maintained unaltered and means for progressively altering the length of the light path may be interposed between said device and said light reflecting means or between said light reflecting means and said point, the last-mentioned means being adjusted until the polarisation of the reflected light at said point has the said predetermined degree of modulation.

If desired, a part only of the said reflected light is passed through means which alters the phase of the said modulation by 180°, it being noted whether at said point there is zero modulation of both said part and of the remainder of the reflected light.

The said device may, if desired, produce polarised light whose polarisation is cyclically modulated at two or more different but closely similar frequencies.

According to another aspect of the present invention, there is provided apparatus for use in testing whether a light reflecting means is in a desired position comprising a device which is adapted to produce a beam of polarised light which may be directed onto said light reflecting means and whose polarisation is cyclically modulated, and analysing means to assist or to effect determination of the extent to which, at a given point, the polarisation of the light reflected from said light reflecting means is modulated, whereby to assist or to effect deduction of the distance of the said device from the said light reflecting means in terms of the wavelength of the cyclical modulation of the polarised light.

Preferably the said device comprises a birefringent crystal, a light source, a polariser for effecting plane polarisation of the light from said light source in a plane parallel to the $x$ or $y$ axis of the crystal, means for applying to said crystal an alternating electric field in the direction of the $z$ axis of said crystal, and means for transmitting said plane polarised light parallel to the $z$ axis of said crystal and through an antinode of said field, said crystal being such as to produce elliptically polarised light whose ellipticity varies cyclically at the frequency of the said alternating electric field.

Preferably the means for applying an alternating electric field comprises a pulsed magnetron, a pulse generator being provided which effects synchronous pulsed operation of both said magnetron and said light source.

The said analysing means may be constituted in part by the said birefringent crystal (or by a like crystal having impressed thereon a like alternating field) and in part by plane polarisation means which are crossed with respect to said polariser.

The analysizing means may comprise two photo-electric detectors, the light reflected by said light reflecting means being passed through two adjacent antinodes of said crystal so as to irradiate the two photoelectric detectors, means being provided for determining when the outputs from said photoelectric detectors are in balance.

The invention is illustrated, merely by way of example, in the accompanying diagrammatic drawing, wherein:

FIGURE 1 is a diagrammatic representation of the apparatus according to the present invention; and FIGURE 2 is a diagrammatic representation of a variable high voltage pulse generator which could be employed in FIGURE 1.

Referring to the drawing, an apparatus for determining the position of a reflecting surface comprises a birefringent crystal 10, e.g. of ammonium dihydrogen phosphate or of potassium dihydrogen phosphate. The crystal 10 is mounted within a resonance cavity 11 of a housing 12, the housing 12 having slots 13, 14 therein.

A high voltage pulse generator 15 controls the synchronous pulsed operation both of a light source such as a xenon flash tube 16 and of a pulsed magnetron 17, the microwave frequency during each pulse being measured by a frequency meter 18. The magnetron 17, which may be adapted for operation at 9,300 mc./s., may, for example, give microsecond pulses of power of about 7 kw. at a repetition frequency of 50 c./s. The magnetron 17 is connected to the housing 11 by a waveguide 20.

The light from the flash tube 16 is collimated by a lens 21 and is passed through the aperture 22 of a diaphragm 23 so as to produce a narrow beam 24. The narrow beam 24 is then passed through a polariser 25, which may be constituted by a sheet of the material sold under the registered trademark "Polaroid."

The polariser 25 is arranged to polarise the light of the beam 24 in a plane parallel to the $x$ or $y$ axis of the crystal 10 and this polarised light is transmitted through the slot 13 so as to pass through the crystal 10 parallel to the $z$ axis thereof.

The magnetron 17 is adapted to produce in the cavity 11 an alternating microwave electric field whose direction is also parallel to the $z$ axis of the crystal 10, the beam 24 passing through an antinode 26 (i.e. a region of maximum field intensity) of the microwave electric field.

The crystal 10 is selected to have the property, when arranged as described above, of producing an elliptically polarised light beam 27 which is directed through the slot 14 and onto a distant plane mirror 28. The elliptical polarisation of the light beam 27 is effected in dependence upon the instantaneous strength of the alternating electric field impressed on the crystal 10 by the magnetron 17. The alternation of the said electric field therefore causes cyclical modulation of the polarisation of the light beam 27, the light beam 27 being successively plane polarised, then elliptically polarised in one sense, then plane polarised again, and then elliptically polarised in the opposite sense, and so on. It will be appreciated that the frequency of the said cyclical modulation is the same as the microwave frequency operating during each pulse and is therefore indicated by the frequency meter 18.

The light beam 27 is reflected from the reflecting surface 30 of the mirror 28 as a light beam 31. The light beam 31 passes through the slot 14 and thence through the crystal 10, parallel to the z axis thereof, to emerge through the slot 13 as a light beam 32. In passing through the crystal 10, the light beam 31 passes through an antinode 33 of the microwave electric field, the antinodes 26, 33 being immediately adjacent to each other. It will be appreciated that, as a result of passing through the crystal 10, the elliptical polarisation of the light beam will either be enhanced or cancelled by the alternating electric field.

The light beam 32 is reflected by a mirror 34 and passes by way of an analyser 35 to a detector 36 which may be constituted by a photoelectric cell or by the eye. The analyser 35 (which may also be constituted by a sheet of "Polaroid" or by a Nicol prism) is crossed with respect to the plane of polarisation of the light polarised by the polariser 25. Thus no light reaches the detector 36 in the absence of elliptical polarisation of the light beam 32.

In operation, the crystal 10 is disposed at a known positon. The distance from the crystal 10 to the reflecting surface 30 is then discovered by any convenient method and to an accuracy which is better than a quarter-wavelength of the modulation frequency, e.g. to less than 8 mm. The mirror 28 is now moved slowly towards or away from the crystal 10 and as this is done the light of the beam 32 will vary between the elliptically polarised and the plane polarised condition in a cyclic manner, such variation being repeated every time the mirror 28 is displaced by an amount equal to one half-wavelength of the modulation. The plane polarised light will not, however, be transmitted by the analyser 35 so that the detector 36 will receive only the component of the elliptically polarised light which is in the plane of polarisation of the analyser. The intensity of this component of the elliptically polarised light will therefore vary cyclically with movement of the mirror 28.

Hence if the mirror 28 is moved until the intensity of the light reaching the detector 36 is at a minimum, which minimum will be sharply marked, the position of the mirror 28 will then be exactly known since it will be disposed a whole number of half-wavelengths from the crystal 10. The size of the wavelength is of course discoverable by dividing the speed of light by the modulation frequency as measured by the meter 18. Accordingly if a micrometer or like device is used to measure the distance through which the mirror 28 is moved to reach such a minimum, an accurate measurement may be made of the distance from the mirror 28 to the crystal 10.

The method described above is particularly suitable for the measurement of distances in the range 10 metres to 300 metres, but is applicable to distances outside the range provided a suitable modulation frequency is chosen.

If say, two or more modulation frequencies are used in turn as from a variable pulse generator 15' in FIGURE 2, said frequencies differing from each other by only a few percent, then the initial distance from the crystal 10 to the mirror 28 need only be known very roughly. This is because there will be very few positions in which the whole set of measured mirror displacements (corresponding to each modulation frequency) to, say, the nearest position of detector minimum, repeats itself.

If it is not convenient to displace the mirror 28, the length of the beam 27 from the crystal 10 to the mirror 28 may be altered by interposing in the path of the beam a device such as a prism or the like which may be moved so as to vary said length. Alternatively said device may be interposed in the reflected beam 31.

An alternative method of locating the position of the mirror 28 is indicated by dotted lines in the drawing. In this method, part of the light reflected from the mirror 28 is reflected as a beam 37 which is parallel to the beam 31 and which passes through an antinode 38 of the microwave electric field, the antinode 38 being the next adjacent antinode to the antinode 33. The beam 37 is then directed by way of a mirror 40 and an analyser 41 onto a photoelectric detector 42.

Since the direction of the microwave electric field is reversed between adjacent antinodes, the cyclical variation in the intensity of the light reaching the detectors 36, 42 will be in antiphase. This is to say, as the mirror 28 is moved, the light intensity received by the detector 36 will be increasing when that received by the detector 42 is decreasing, and vice versa.

Accordingly, if the detector 36 is a photoelectric detector and the outputs from the detectors 36, 42 are fed to a difference amplifier 43 which is connected to an indicator 44, the indicator 44 will indicate when the said outputs are in balance. Such balance points are spaced from each other by distances of a quarter of a modulation wavelength but it is preferred to use only alternate balance points for measurements.

We claim:

1. Apparatus for use in testing whether a light reflecting means is in a desired position, comprising a birefringent crystal, a light source, a polariser for effecting plane polarisation of the light from said light source in a plane parallel to the x or y axis of the crystal, a pulsed magnetron for applying to said crystal an alternating electric field in the direction to the z axis of said crystal, a pulse generator which effects synchronous pulsed operation of both said magnetron and said light source, means for transmitting a beam of said plane polarised light parallel to the z axis of said crystal and through an antinode of said field, said crystal producing elliptically polarised light whose ellipticity varies cyclically at the frequency of the said alternating electric field, plane polarisation means which are crossed with respect to said polariser, said plane polarisation means being disposed in the path of light which has been reflected from said light reflecting means and has passed back through said crystal, and a photoelectric detector onto which falls light which has passed through the plane polarisation means.

2. Apparatus as claimed in claim 1 in which there are two photoelectric detectors, means for determining when the outputs from said photoelectric detectors are in balance, and means for passing different portions of the light reflected from the light reflecting means through two adjacent antinodes of said crystal and onto the said photoelectric detectors.

3. Apparatus for use in testing whether a light reflecting means is in a desired position comprising a birefringent crsytal, a light source, a polarizer for effecting plane polarization of the light from said light source in a plane parallel to the x or y axis of the crsytal, means for applying to said crystal an alternating electric field in the direction of the z axis of said crystal, means for transmitting a beam of said plane polarized light parallel to the z axis of said crystal and through an antinode of said field and onto the said light reflecting means said crystal producing ellipitically polarized light whose ellipticity varies cyclically at the frequency of the said alternating electric field, an analyzer which is crossed with respect to said polarizer, and a photo electric detector onto which falls light which has been reflected from said light reflecting means and has passed back through said crystal.

4. Apparatus for use in testing whether a light reflecting means is in a desired position comprising a birefringent crystal, a light source, a polarizer for effecting plane polarization of the light from said light source in a plane parallel to the $x$ or $y$ axis of the crystal, a pulsed magnetron for applying to said crystal an alternating electric field in the direction of the $z$ axis of said crystal, a pulse generator which effects synchronous pulsed operation of both said magnetron and said light source, means for transmitting a beam of said plane polarized light parallel to the $z$ axis of said crystal and through an antinode of said field, said crystal producing elliptically polarized light whose ellipticity varies cyclically at the frequency of the said alternating electric field, an analyzer which is crossed with respect to said polarizer, and a photo electric detector onto which falls light which has been reflected from said light reflecting means and has passed back through said crystal.

5. Apparatus for use in testing whether a light reflecting means is in a desired position comprising a birefringent crystal, a light source, a polarizer for effecting plane polarization of the light from said light source in a plane parallel to the $x$ or $y$ axis of the crystal, means for applying to said crystal an alternating electric field in the direction of the $z$ axis of said crystal, means for transmitting a beam of said plane polarized light parallel to the $z$ axis of said crystal and through an antinode of said field and onto the said light reflecting means, said crystal producing elliptically polarized light whose ellipticity varies cyclically at the frequency of the said alternating electric field, an analyzer which is crossed with respect to said polarizer, two photoelectric detectors, means for determining when the outputs from said photoelectric detectors are in balance, and means for passing different portions of the light reflected from the light reflecting means through two adjacent antinodes of said crystal and onto the said photoelectric detectors.

6. Apparatus for use in testing whether a light reflecting means is in a desired position comprising a birefringent crystal, a light source, a polariser for effecting plane polarisation of the light from said light source in a plane parallel to the $x$ or $y$ axis of the crystal, means for applying to said crystal an alternating electric field in the direction of the $z$ axis of said crystal, means for transmitting a beam of said plane polarised light parallel to the $z$ axis of said crystal and through an antinode of said field and onto the said light reflecting means, said crystal producing elliptically polarised light whose ellipticity varies cyclically at the frequency of the said alternating electric field, an analyzer which is crossed with respect to said polariser, a photoelectric detector onto which falls light which has been reflected from said light reflecting means and has passed back through the crystal, and means for changing the frequency of said alternating electric field between at least two different but closely similar frequencies.

References Cited by the Examiner
UNITED STATES PATENTS

| | | | |
|---|---|---|---|
| 2,707,749 | 5/55 | Mueller | 88—65 |
| 2,930,278 | 3/60 | Hansen et al. | 88—1 |
| 2,966,090 | 12/60 | Scholdstrom | 88—1 |
| 2,966,824 | 1/61 | Granqvist | 88—1 |
| 2,974,568 | 3/61 | Dillon | 88—61 |

OTHER REFERENCES

Handbook, American Institute of Physics, 1st, edition, 1957, pages 6–94 to 6–97.

JEWELL H. PEDERSEN, *Primary Examiner.*

EMIL G. ANDERSON, *Examiner.*